Oct. 1, 1935.  H. E. BURTON  2,015,741
BRAKE MECHANISM
Original Filed Dec. 12, 1931
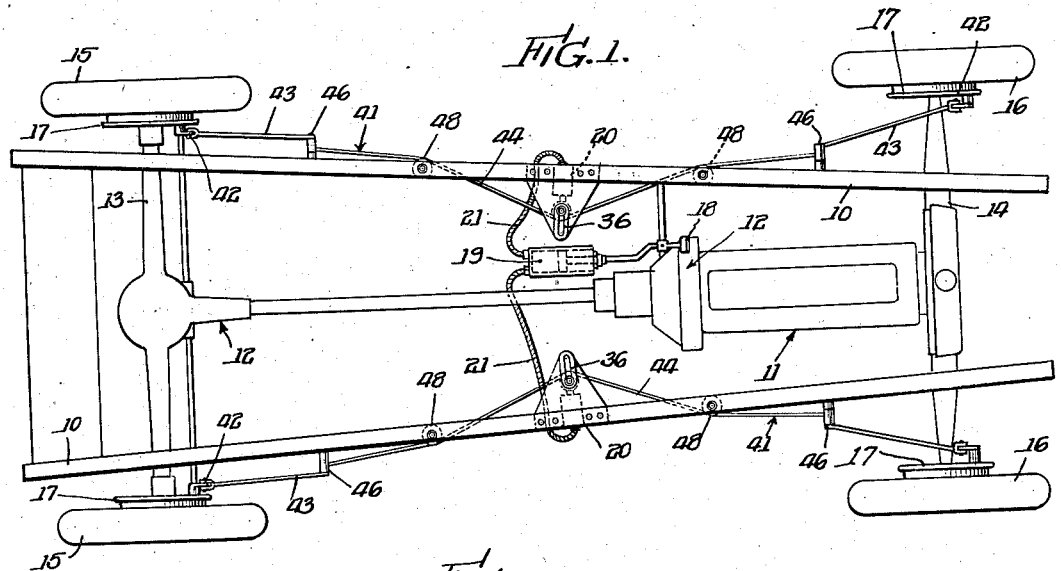
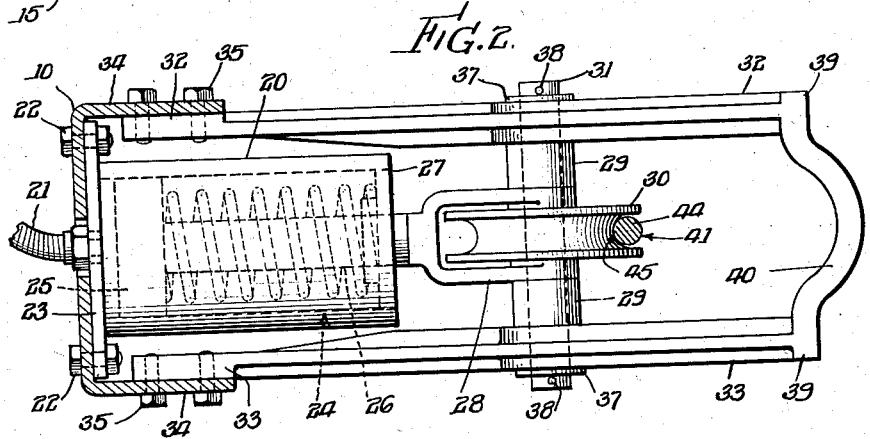
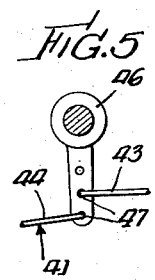
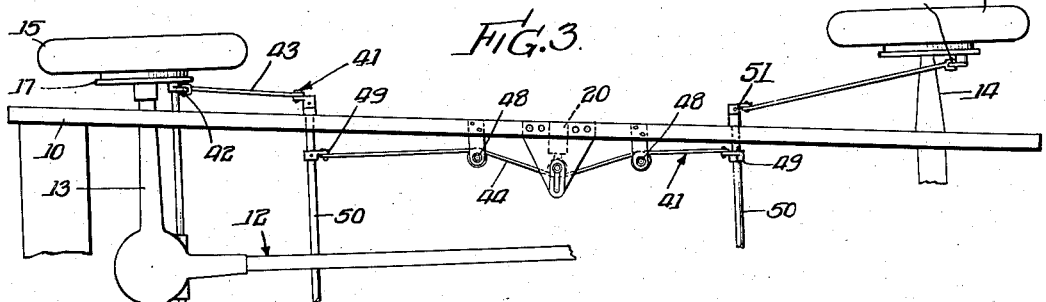
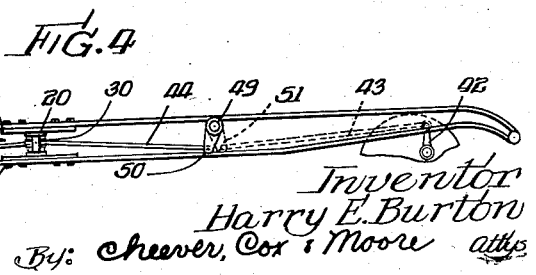
Inventor
Harry E. Burton
By: Cheever, Cox & Moore attys Patented Oct. 1, 1935

2,015,741

UNITED STATES PATENT OFFICE 2,015,741

BRAKE MECHANISM

Harry E. Burton, Chicago, Ill.; Elizabeth Burton, executrix of said Harry E. Burton, deceased, assignor to Bendix Products Corporation, South Bend, Ind., a corporation of Indiana Application December 12, 1931, Serial No. 580,546
Renewed September 1, 1934

7 Claims. (Cl. 188—152)

This invention relates to brake mechanism and particularly, though not exclusively, to mechanism for automobiles having four-wheel brakes.

The primary object of the invention is to provide a new and improved brake arrangement consisting of few and simple parts arranged according to a predetermined embodiment so as to render the brakes exceedingly efficient with the utmost in ease of operation.

Another object is to provide brake mechanism which has the advantage of ease in operation, having the lightness of brake foot pedal operation inherent to hydraulic brakes but without the complications and disadvantages of hydraulic brakes, and still have the efficient positive characteristics of mechanical brakes without the power or pressure ordinarily required in mechanical brakes.

A further object is to provide automobile brake mechanism which has certain parts situated in particular positions relative to other parts to provide light pedal pressure with positive and efficient braking action.

A still further object is to provide brake mechanism for automobiles which mechanism maintains the efficient and advantageous characteristics of both types of brakes.

Still another object is to provide hydraulically controlled mechanism for operating mechanically operated brakes, the hydraulic mechanism being so constructed and arranged that an even positive braking action is provided, there being means for assuring evenness of brake action due to the double outlet of the fluid lines which are arranged to cause all slack to be taken up in a loose cable before braking action is applied, thereby providing evenness and equal braking action.

Numerous other objects and advantages will be apparent throughout the progress of the following specification.

The accompanying drawing illustrates a selected embodiment of the invention and the views therein are as follows:

Fig. 1 is a detail plan view of an automobile chassis to which the invention is applied.

Fig. 2 is a detail sectional vew taken longitudinally through an auxiliary plunger and showing hydraulic means for operating mechanical brakes.

Fig. 3 is a view similar to Fig. 1 showing a modified arrangement of brake operating members.

Fig. 4 is a detail elevation, partly in section, showing a part of the structure disclosed in Fig. 3.

Fig. 5 is a detail elevation of a front adjustment lever.

The particular brake mechanism herein shown is an improvement over that shown in Patent No. 1,811,172, issued June 23, 1931, and is particularly adaptable for attachment to an automobile. The automobile chassis herein shown for the purpose of illustrating one form of the invention, includes the usual front to rear side bars or frame members 10 which support the motor 11 and other mechanism associated therewith, indicated generally by the numeral 12, which drives the machine. A rear axle 13 and a front axle 14 are provided with rear wheels 15 and front wheels 16 respectively being operatively arranged and mounted in the usual manner. The wheels 15 and 16 may be provided with brake drums and brakes 17 which are of the conventional type. The brakes may be either the internal expansion or the external contraction type as preferred, the invention relating to the mechanism for operating the brakes and not the brakes per se.

A brake pedal 18 is operatively connected to a part of the chassis and operates a master mechanism 19, of either the hydraulic or air pressure type. This master mechanism is operatively connected to auxiliary plungers 20 through the medium of piping 21 in the usual conventional manner.

The auxiliary plungers 20, Fig. 2, are each mounted on a side bar 10 in any convenient manner such as by bolts 22 passing through an end flange 23, Fig. 2. Each plunger 20 comprises a chamber or cylinder 24 in which there is mounted a piston 25 having a connecting rod 26 which extends through the end of the casing 27. The end of the connecting rod 26 carries a bifurcated member 28 to which bearings 29 may be fastened. A pulley 30 is arranged between the arms of the bifurcated member 28 and is revolubly mounted on an axis or shaft 31 which is supported by the bearings 29.

Upper and lower plates or supports 32 and 33 respectively are fixed to the side bar flanges 34 by means of bolts 35 passing through the flanges and tapped in the plates. These plates extend inwardly of the side bars a predetermined distance and are provided with oppositely alined slots 36 into which the ends of the pulley supporting shaft 31 extends. Washers 37 surround the shaft 31 and engage the tops and bottoms of the respective plates, the shaft being held from vertical displacement by cotter pins 38. The ends 39 of the plates may be connected together by an arched connecting member 40 to prevent spreading of the plates. The plates act as a guide for the connecting rod 26 and keep the pulley in proper operable position at all times preventing any bending, swaying, or racking of the plunger rod 26 or any of its connecting parts. Regardless of any strain on the pulley, the pulley or piston is restricted to movement in two directions only, in and out. When pressure is applied to the foot pedal 18, the master mechanism 19 causes fluid to pass to the auxiliary plungers 20 to move the pistons and consequently the rods 26 simultaneously.

Front to rear members 41 are connected to the brake arms 42 of a front and rear brake on the same side of the automobile. These members 41 may constitute rod members 43 and cable members 44 although these members may be made of a continuous piece or length of cable. Regardless of the manner in which the members 41 are made up, their central portion is of cable 44 which passes over the pulley 30 as designated at 45 in Fig. 2. The cable part 44 may have its ends connected to levers 46, Fig. 1, to rock these levers, the rocking movement of the levers causing responsive action of the brakes. The front levers 46 may be provided with a series of holes 47, Fig. 5, to which proper connection is made to vary the braking action of the front brakes relative to the rear brakes. Guide pulleys 48, Fig. 1, may be arranged at proper positions to guide and support the cable 44.

The cable 44 may be connected to levers 49 mounted on the cross shafts 50 to rock these shafts, Figs. 3 and 4. Arms 51 may be carried at the ends of these shafts to move the brake arms 42 for operating the brakes. The front arms 51 may be constructed like the levers 46, having a series of holes provided therein for varying the pressure on the front brakes relative to the normal pressure on the rear brakes.

A feature of the invention resides in the positioning of the piping 21 relative to the master hydraulic member 19. The piping 21 is connected to a pair of outlets at one end, the compression end, of the reservoir. The fluid thus compressed by the master plunger will of course follow the line of least resistance. Thus, if one cable is relatively loose, and the other cable relatively taut, the compressed fluid will move the piston at the loose side out a sufficient distance until the cable operated by that piston has substantially the same bearing on the formerly loose cable as the piston operating on the taut cable. The fluid is thereby equally distributed so that pressure will be equalized on both cables, and consequently the braking action on each side will be exactly the same. It thereby follows that regardless whether one cable is loose and another taut, the braking action and pressure is positively equalized.

Operation

When pressure is applied to the foot pedal 18, fluid will pass to the auxiliary plungers causing the rods 26 to move inwardly out of the casing. This movement causes a tension to be exerted on the cable 44 and rocks the levers, this rocking movement pulling the rods 43 causing braking action on the brake drums. Continued pressure causes greater braking action as more fluid is forced into the auxiliary plungers and consequently greater braking is obtained. As soon as the pedal is released, pressure will no longer be applied on the pistons 25 and the parts will return to normal or non-braking or non-pressure position.

The invention provides automobile brake mechanism which is composed of very few and exceedingly simple parts to provide positive and efficient braking action. The parts may be installed easily at a very low cost and the parts may be economically manufactured. The mechanism responds to a light touch as is usual in complete hydraulic systems but contains the simple adjustment features and positive braking action of mechanical brakes. The invention preserves the salient features of both types of brakes and omits the disadvantages of both.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In an automobile having a frame, wheels for said automobile, a brake for each wheel, front to rear members connected to said brakes on each side, said front to rear members including a cable, a hydraulically controlled plunger connected to said frame on each side for operating said front to rear members, each plunger carrying a pulley engageable with said cable, means for operating the plungers, and means for guiding said plungers.

2. In an automobile having a frame, wheels for said automobile, a brake for each wheel, front to rear members connected to said brakes on each side, said front to rear members including a cable, a hydraulically controlled plunger connected to said frame on each side for operating said front to rear members, each plunger carrying a pulley engageable with said cable, means for operating the plungers, upper and lower plates fixed to the frame on each side, said plates being provided with slots therein, a shaft carried by said plunger and upon which said pulley is mounted, said shaft extending through the openings in the plates for guiding and supporting said pulley.

3. In an automobile having four wheel brakes, a front to rear member connecting the brakes on each side of the automobile and including a cable, hydraulically controlled mechanism for operating each front to rear member, said hydraulically controlled mechanism comprising a plunger, a pulley revolubly supported by said plunger for operating said cable, and hydraulic means for operating said plunger.

4. In an automobile having four wheel brakes, a front to rear member connecting the brakes on each side of the automobile and including a cable, hydraulically controlled mechanism for operating each front to rear member, said hydraulically controlled mechanism comprising a plunger, a pulley revolubly supported by said plunger for operating said cable, hydraulic means for operating said plunger, plates connected to the automobile frame, and means engaging said plates for guiding the movement of the plunger.

5. In an automobile having four wheel brakes, a front to rear member connecting the brakes on each side of the automobile and including a cable, hydraulically controlled mechanism for operating each front to rear member, said hydraulically controlled mechanism comprising a plunger, a U-shaped end for said plunger, upper and lower plates fixed to the automobile frame and having slots therein, a cross member extending through said slots and operatively engaging the end of the plunger and the cable for guiding the movement of the plunger, and means for operating the plunger.

6. In an automobile having four wheel brakes, a front to rear member connecting the brakes on each side of the automobile and including a cable, hydraulically controlled mechanism for operating each front to rear member, said hydraulically controlled mechanism comprising a plunger, a U-shaped end for said plunger, upper and lower plates fixed to the automobile frame and having slots therein, a cross member extending through said slots and operatively engaging the end of the plunger and the cable for guiding the movement of the plunger, means for operating the plunger, and means connected to the ends of said plates for holding the plates in proper spaced position.

7. In a vehicle having four wheel brakes, a pair of cables, one connected to both of the brakes on one side and the other connected to both of the brakes on the opposite side, a hydraulic master cylinder, a pair of hydraulic motors, fluid conduits connecting said master cylinder and said motors, and means responsive to actuation of said fluid motors for tensioning said cables.

HARRY E. BURTON.